(12) United States Patent
Storteboom et al.

(10) Patent No.: US 8,800,456 B2
(45) Date of Patent: *Aug. 12, 2014

(54) T3 FOR A SHIPPING PLATFORM

(71) Applicant: CHEP Technology Pty Limited, Sydney (AU)

(72) Inventors: John Thomas Storteboom, Orlando, FL (US); Oivind Brockmeier, Medford, MA (US); Brandon M. D'Emidio, Orlando, FL (US); Timothy R. Proulx, Nashua, NC (US); Gregory S. Burkett, Cambridge, MA (US); Jeffrey R. Chapin, Cambridge, MA (US); Kenneth M. Brandt, Orlando, FL (US)

(73) Assignee: Chep Technology Pty Limited, Sydney NSW (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/716,092

(22) Filed: Dec. 15, 2012

(65) Prior Publication Data

US 2013/0153452 A1    Jun. 20, 2013

Related U.S. Application Data

(60) Provisional application No. 61/576,985, filed on Dec. 17, 2011.

(51) Int. Cl.
*B65D 19/00* (2006.01)
*B23P 11/00* (2006.01)

(52) U.S. Cl.
CPC .. B65D 19/0093 (2013.01); *B65D 2519/00059* (2013.01); *B65D 2519/00029* (2013.01); *B65D 2519/00079* (2013.01); *B65D 2519/00273* (2013.01); *B65D 2519/00572* (2013.01); *B65D 2519/00044* (2013.01); *B65D 2519/00373* (2013.01); *B65D 2519/00099* (2013.01); *B65D 2519/00323* (2013.01); *B65D 2519/00034* (2013.01); *B65D 2519/00293* (2013.01); *B65D 2519/00348* (2013.01); *B65D 2519/00024* (2013.01); *B65D 2519/00094* (2013.01); *B65D 2519/00104* (2013.01); *B65D 2519/00069* (2013.01); *B65D 2519/00114* (2013.01); *B65D 2519/00064* (2013.01); B23P 11/00 (2013.01); *B65D 2519/00437* (2013.01)
USPC ...................................... 108/51.11; 108/56.1

(58) Field of Classification Search
CPC .......... B65D 2519/00323; B65D 2519/00034; B65D 2519/00024; B65D 2519/00059; B65D 2519/00069; B65D 2519/00094; B65D 2519/00104; B65D 2519/00243; B65D 2519/00258
USPC .......... 108/51.11, 57.25, 901, 902, 56.1, 56.3
See application file for complete search history.

(56) References Cited

U.S. PATENT DOCUMENTS

| | | | | | |
|---|---|---|---|---|---|
| 2,503,022 | A | * | 4/1950 | Benoist et al. | 108/57.17 |
| 4,292,899 | A | * | 10/1981 | Steffen | 108/51.11 |
| 4,715,294 | A | * | 12/1987 | Depew | 108/57.17 |
| 5,076,175 | A | * | 12/1991 | Whatley, II | 108/51.11 |
| 5,351,628 | A | * | 10/1994 | Breezer et al. | 108/56.1 |
| 5,417,167 | A | * | 5/1995 | Sadr | 108/57.19 |

(Continued)

*Primary Examiner* — Jose V Chen
(74) *Attorney, Agent, or Firm* — Ido Tuchman

(57) ABSTRACT

A system may include a bottom deck to a shipping platform. The system may also include a block joined to the bottom deck, and a top deck joined to the block. The system may further include a T3 panel carried by the top deck that is structurally different from the top deck and does not extend to two ends of the top deck.

17 Claims, 11 Drawing Sheets

(56) References Cited

U.S. PATENT DOCUMENTS

| | | | |
|---|---|---|---|
| 5,673,629 A * | 10/1997 | Ginnow | 108/57.17 |
| 5,868,080 A * | 2/1999 | Wyler et al. | 108/57.25 |
| 5,960,721 A * | 10/1999 | Huetteman et al. | 108/57.17 |
| 6,101,955 A * | 8/2000 | Salce | 108/51.11 |
| 6,216,608 B1 * | 4/2001 | Woods et al. | 108/57.25 |
| 6,584,915 B1 * | 7/2003 | Rogers | 108/56.1 |
| 6,622,642 B2 * | 9/2003 | Ohanesian | 108/57.25 |
| 7,487,730 B2 * | 2/2009 | Hedstrom | 108/56.3 |
| 8,033,228 B2 * | 10/2011 | Haney et al. | 108/132 |
| 8,261,673 B2 * | 9/2012 | Ingham | 108/51.11 |
| 8,291,837 B2 * | 10/2012 | Kirkpatrick | 108/56.1 |
| 8,627,773 B2 * | 1/2014 | Storteboom et al. | 108/51.11 |
| 2006/0005746 A1 * | 1/2006 | Gouldin, Jr. | 108/51.11 |
| 2006/0278137 A1 * | 12/2006 | Shimada | 108/51.11 |
| 2007/0017423 A1 * | 1/2007 | Ingham | 108/57.17 |
| 2008/0156234 A1 * | 7/2008 | van de Camp | 108/51.11 |
| 2011/0132237 A1 * | 6/2011 | Brandt et al. | 108/51.11 |
| 2011/0303128 A1 * | 12/2011 | Linares | 108/51.3 |

* cited by examiner

T3 FOR A SHIPPING PLATFORM

RELATED APPLICATIONS

This application claims the benefit of co-pending U.S. Provisional Patent Application No. 61/576,985, filed on Dec. 17, 2011, entitled "Improved T3 for a Shipping Platform", the entire subject matter of which is incorporated herein by reference in its entirety.

BACKGROUND

Shippers, manufacturers, wholesalers, retailers, and/or the like move merchandise, materials, and/or the like (e.g. load, to customers, end-users, and/or the like) on shipping platforms (e.g. pallet, containers, and/or the like). This technique of bulk shipping may reduce the cost related to moving the load when compared to non-bulk shipping methods. As a result, all parties in the distribution chain may benefit from lower shipping costs due to this bulk shipping technique.

There are a number of issues with the above described technique. One issue is that shipping platforms are exposed to a harsh operating environment. Another issue is the shipping platform may be restricted in any number of ways by regulatory and/or standardization requirements.

SUMMARY

According to one embodiment, a system may include a bottom deck to a shipping platform. The system may also include a block joined to the bottom deck, and a top deck joined to the block. The system may further include a T3 panel carried by the top deck that is structurally different from the top deck and does not extend to two ends of the top deck.

The T3 panel may comprise plastic, plastic-metal composite, metal, and/or plywood. The T3 panel may comprise lightening holes and lightening reliefs.

The top deck may comprise wood. The metal component of the plastic-metal composite may provide structural support for the T3 panel.

The metal component may comprise a round bar, U-channel, and L-channel. The T3 panel may comprise a plurality of T3 panels separated by a center board.

The metal component may include flanging, embossed beads, dimpling, and/or creases. The T3 panel may adjoin the top deck along an edge to increase rigidity of the top deck.

Another aspect of the embodiments is a method. The method may include providing a shipping platform. The method may also include joining a T3 panel structurally different from the shipping platform's top deck to the top deck.

The T3 panel may comprise plastic, plastic-metal composite, metal, and/or plywood, and the shipping platform's top deck comprises wood. The method may further include adding lightening holes and/or lightening reliefs to the T3 panel.

The method may additionally include providing structural support for the T3 panel via a metal component. The method may also include separating by a center board a plurality of T3 panels.

The method may further include strengthening the metal component by flanging, embossed beads, dimpling, and/or creases.

The method may additionally include adjoining the T3 panel along an edge of the top deck to increase rigidity of the top deck.

An alternative embodiment of the system may include a bottom deck to a shipping platform. The system may also include a block joined to the bottom deck, and a wooden top deck joined to the block. The system may further include a T3 panel carried by the top deck that is structurally different from the top deck and does not extend to two ends of the top deck, and where the T3 panel comprises plastic, plastic-metal composite, metal, and/or plywood.

DETAILED DESCRIPTION

Embodiments will now be described more fully hereinafter with reference to the accompanying drawings, in which preferred embodiments are shown. Like numbers refer to like elements throughout.

Figure 1:
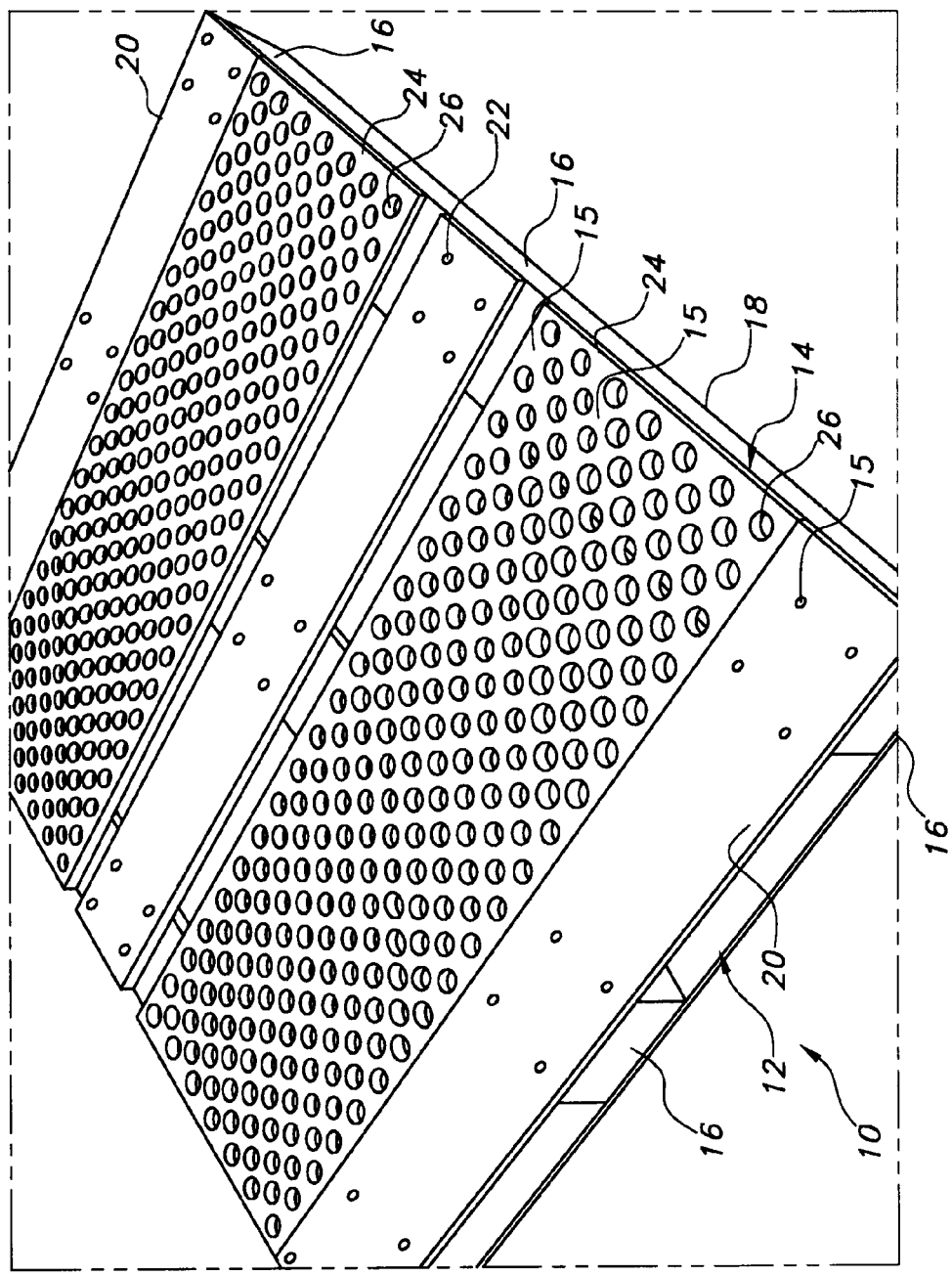
FIG. 1 illustrates an improved T3 shipping platform in accordance with the invention.

With reference to FIG. 1, an improved system 10 for a shipping platform 12 is initially described. In this embodiment, the shipping platform 12 is fabricated out of a top deck 14 joined to a block 16, that is joined to a bottom deck 18. The top deck 14, the block 16, and/or the bottom deck 18 comprise wood, metal, plastic, composite materials, and/or the like.

In one embodiment, the top deck 14, the block 16, and/or the bottom deck 18 utilizes fasteners 15 such as nails, screws, dowels, and/or the like for their joinery. This enables the top deck 14, the block 16, and/or the bottom deck 18 of the pallet 12 to be assembled and/or repaired as needed.

In one embodiment, the top deck 14 comprises a T1 lead-board 20 on either end of the top deck and a center-board 22 in the middle of the top deck. In another embodiment, the T1 lead-board 20 comprises plywood, plastic, plastic metal hybrid, metal, composites, and/or the like attached to a wood top deck 14. In another embodiment, the system 10 replaces all the T3 boards of a traditional pallet with a T3 panel 24 on either side of the center-board 22.

In one embodiment, the T3 panel 24 comprises wood, plywood, plastic, plastic metal hybrid, metal, composites, and/or the like. In another embodiment, the T3 panel 24 may include lightening holes 26 that reduce the overall weight of the T3 panel.

The T3 panel 24 helps to reduce the number of missing T3 top-deck boards of a traditional pallet. The T3 panel 24 also has a higher retention force than individual T3 boards, thus helping to keep the T3 panel in place on the top deck 14. In addition, the T3 panel 24 increases the structural strength of the pallet 12 by increasing the rigidly of the pallet by spreading torsion loads experienced by the joinery over a wider area when compared to the torsion loads experienced by traditional single T3 boards.

The T3 panel 24 does all the aforementioned without, or minimal, weight increase of the total pallet weight. The single T3 panel 24 also does all the aforementioned without, or minimal, changes to the overall dimensions of the pallet 12.

Figure 2:
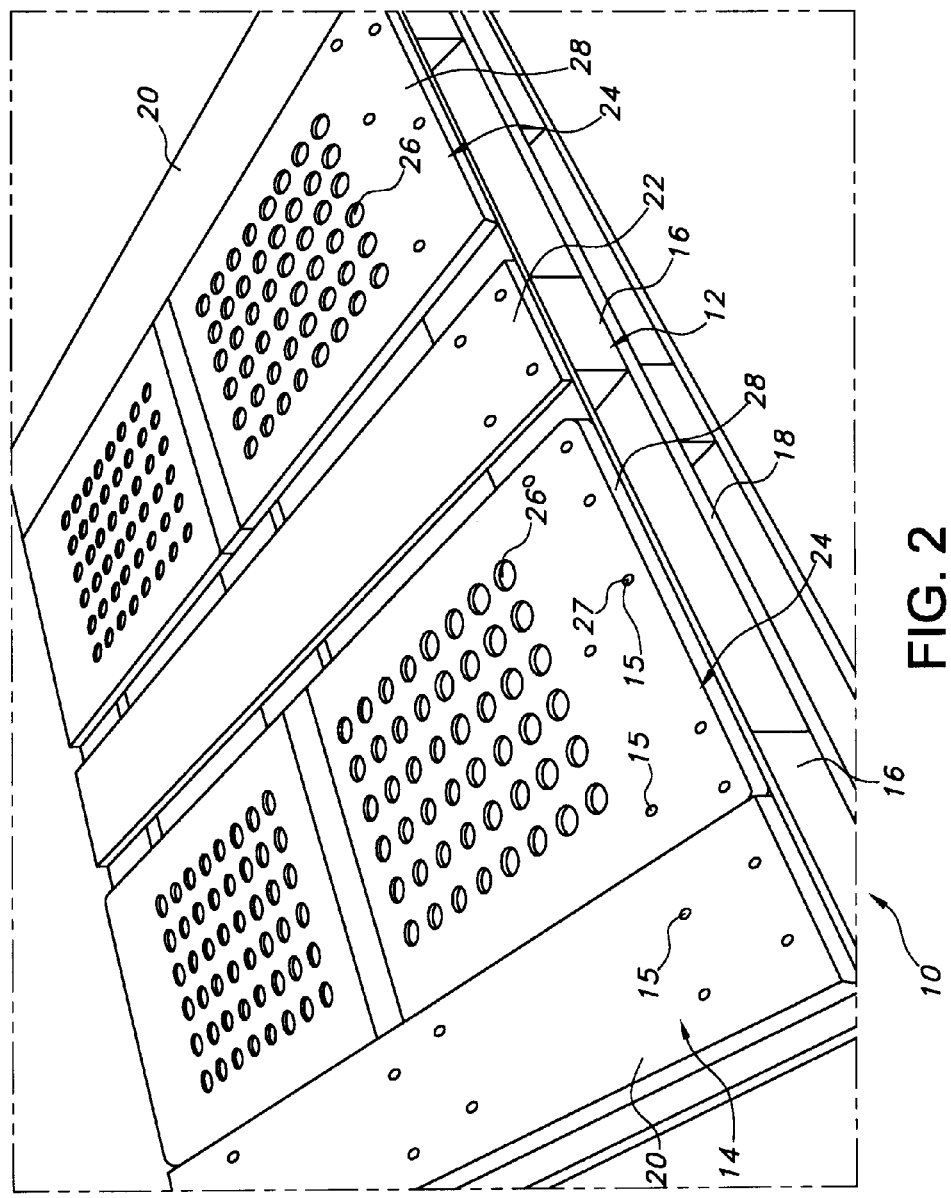
FIGS. 2 and 3 illustrate an alternative improved T3 shipping platform in accordance with the invention.
Figure 3:
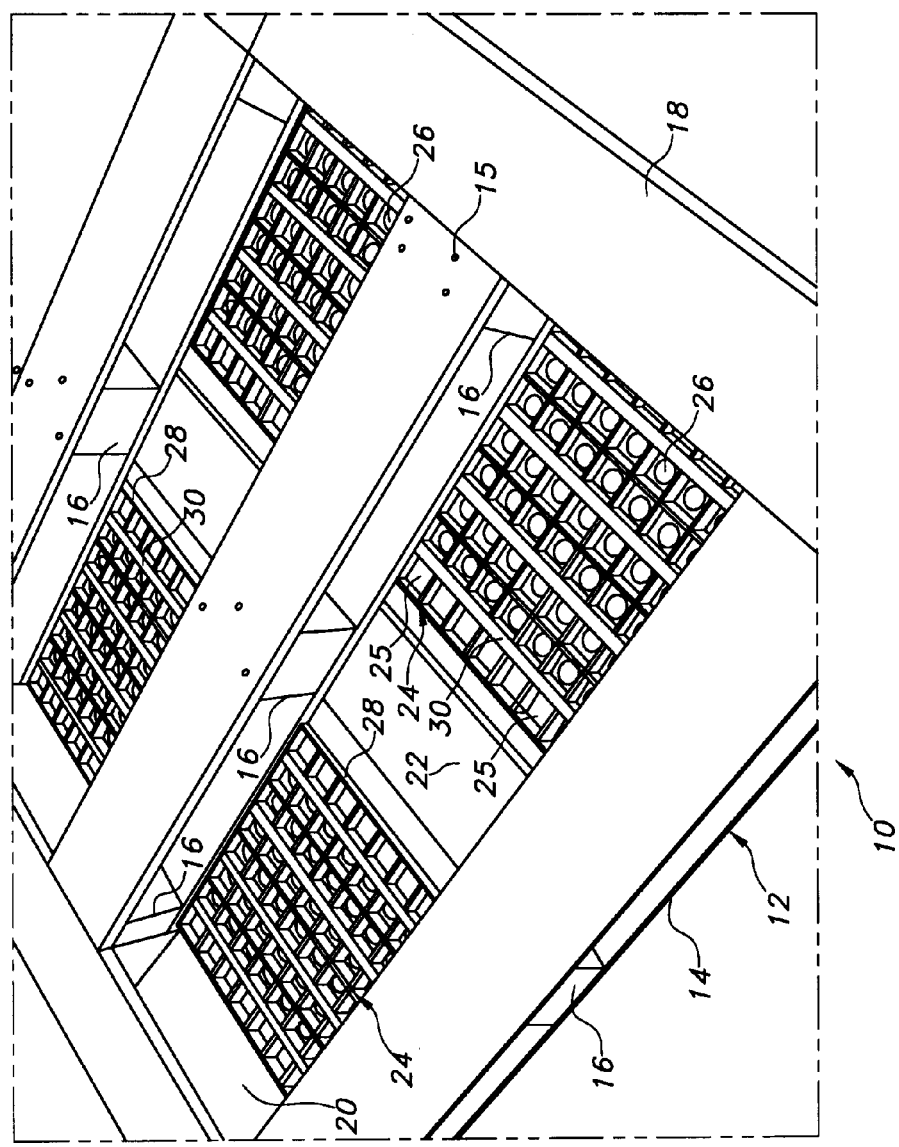

With additional reference to FIGS. 2 and 3, an alternative improved system 10 for a shipping platform 12 is initially described. In this embodiment, the T3 panel 24 is a plastic metal hybrid including a plastic skin 28 reinforced by metal supports 30. In another embodiment, the metal supports 30 comprise u-channels and/or the like.

Figure 4:
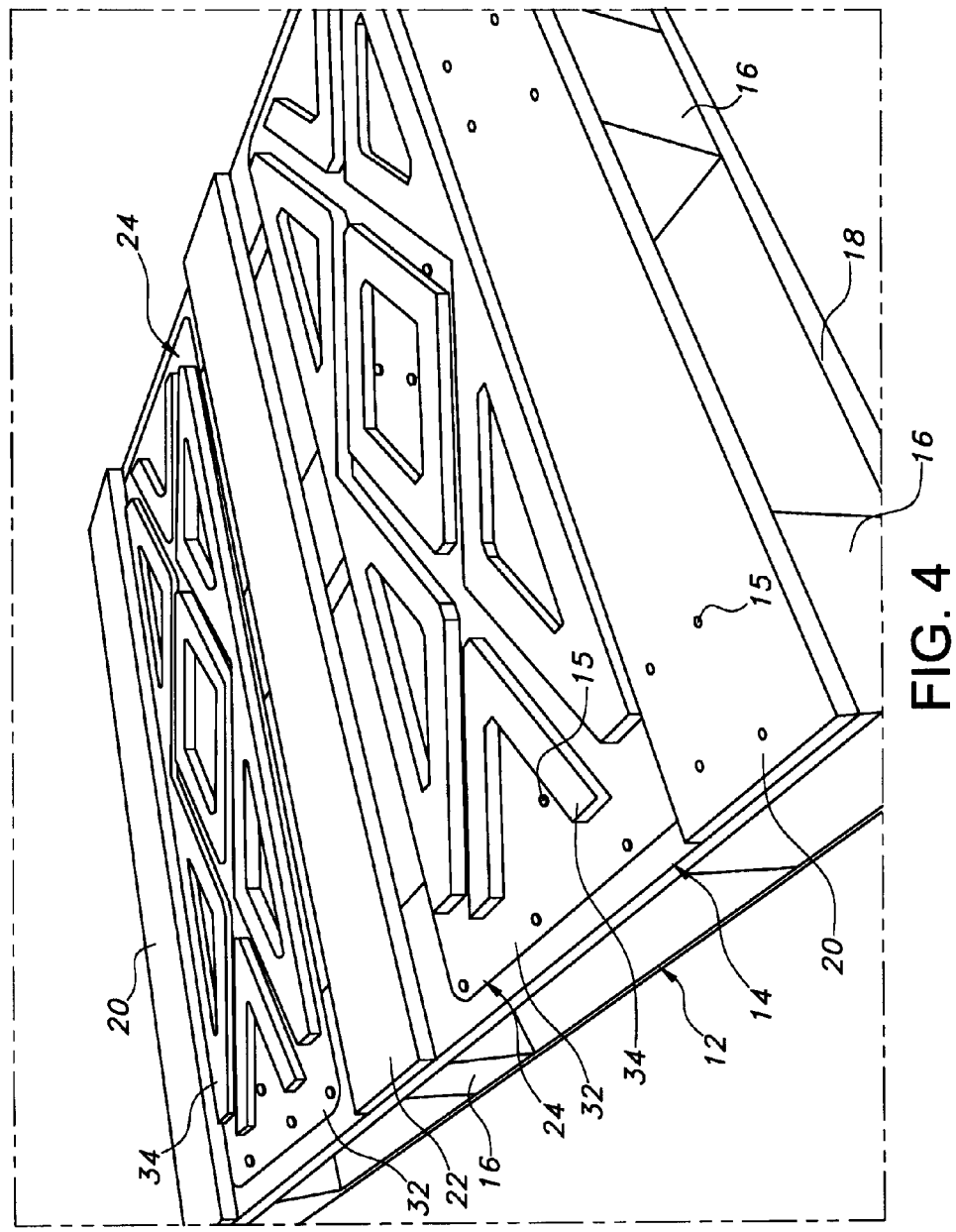
FIG. 4 illustrates an alternative improved T3 shipping platform in accordance with the invention.

With reference to FIG. 4, an alternative improved system 10 for a shipping platform 12 is initially described. In this embodiment, the T3 panel 24 is a metal sheet 32 including reinforcement supports 34. In another embodiment, the reinforcement supports 34 comprise a relief stamped into the metal sheet 32 and/or metal channels applied to the metal sheet 32.

The system 10 addresses durability issues of shipping platforms 12 while also keeping the shipping platforms within standardization requirements. In other words, system 10 changes the dimensions of a shipping platform 10 very little. As a result, system 10 can be deployed with little impact to the overall system in which the shipping platforms 12 flow. In addition, the system 10 also provides a retrofit option that can be deployed to improve an existing pool of shipping platforms 12.

In one embodiment, the system 10 includes a bottom deck 18 to a shipping platform 12. The system 10 also includes a block 16 joined to the bottom deck 18, and a top deck 14 joined to the block. The system 10 further includes a T3 panel 24 carried by the top deck 14 that is structurally different from the top deck and does not extend to two ends of the top deck.

In one embodiment, the T3 panel 24 comprises plastic, plastic-metal composite, metal, and/or plywood. In another embodiment, the T3 panel 24 comprises lightening holes 26 and lightening reliefs 25 that reduce the overall weight of the T3 panel. The lightening reliefs 25 are similar to the lightening holes 26, but without going all the way through both sides of the lightened surface.

In one embodiment, the top deck 14 comprises wood. In another embodiment, the metal component 30 of the plastic-metal composite may provide structural support for the T3 panel 24.

Figure 11:
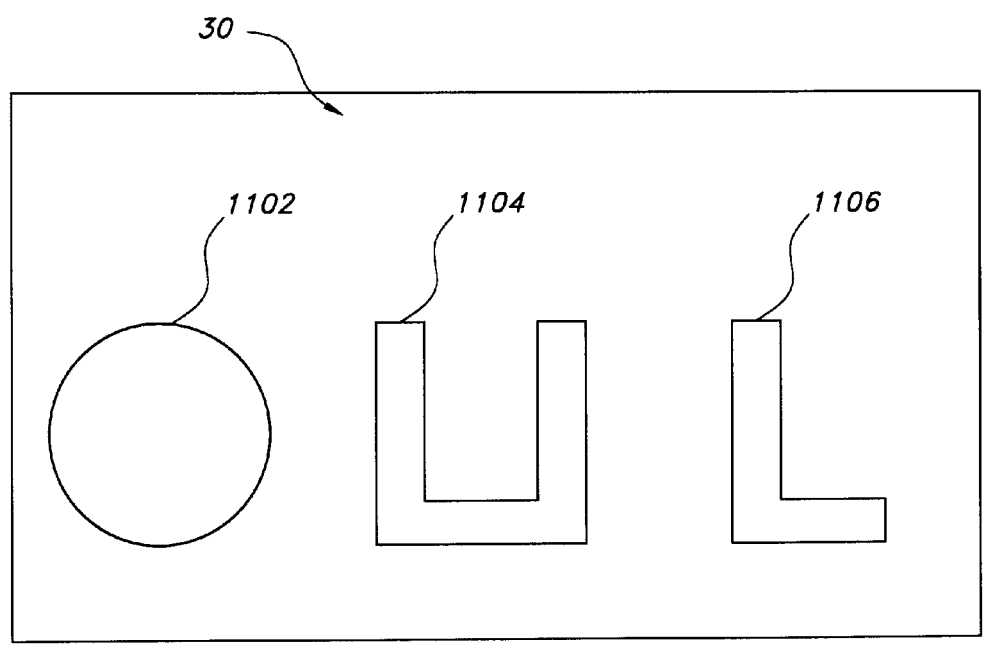
FIG. 11 illustrates a metal component comprising a round bar, U-channel, or L-channel.

In one embodiment, the metal component 30 comprises a round bar 1102, U-channel 1104, and/or L-channel 1106, as shown in FIG. 11. For instance, the metal component 24 utilizes ⅛" thick metal bars to provide stiffness. In another embodiment, the metal components 24 are only ½" high.

In one embodiment, the metal component 30 will deflect nails. In another embodiment, the T3 panel 24 comprises a plurality of T3 panels separated by a center board 22.

In one embodiment, the metal component 30 includes flanging, embossed beads, dimpling, and/or creases to increase its strength. In another embodiment, the T3 panel 24 adjoins the top deck 14 along an edge to increase rigidity of the top deck.

In one embodiment, the T3 panel 24 comprises a plastic hybrid where an insert 27 is positioned on the T3 panel 24 mold where fasteners 15 are applied to the T3 panel so as to position the fastener heads, e.g. nails heads, properly. In other words, the insert 27 keeps the fasteners 15 from penetrating too deeply into the surface of the T3 panel 24.

In one embodiment, the insert 27 comprises an added component to the plastic T3 panel 24, such as metal inserts, higher density plastic inserts, a metal screen, and/or the like inserted into the T3 panel. For example, a plastic T3 panel 24 with high density plastic second shot to stop nails heads 15.

In one embodiment, the T3 panel 24 includes pins each end that provide a mechanical joint as well as a friction joint because the pins are seated into the wood member it is joined to. The pins also serve as to reduce the overall weight of the T3 panel 24 in a manner similar to lightening holes 26, but without going all the way through both sides of the lightened surface. The T3 panel 24 provides increased durability because of its ability to absorb impulse forces less destructively than a plain wooden T3 board.

Figure 5:
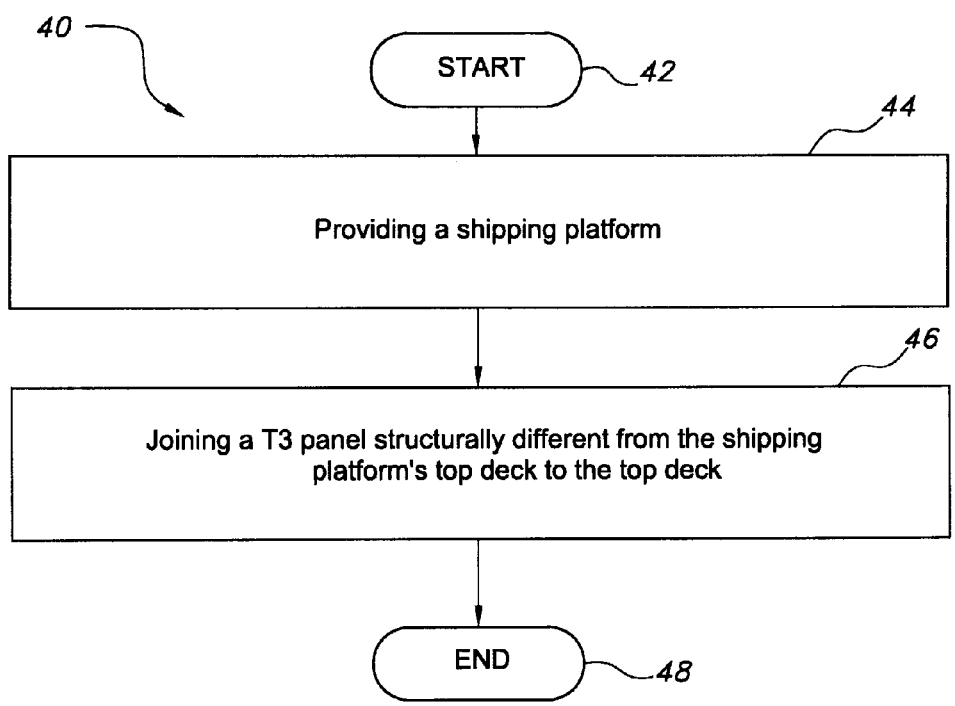
FIG. 5 is a flowchart illustrating method aspects according to embodiments.

Another aspect of the embodiments is a method, which is now described with reference to flowchart 40 of FIG. 5. The method begins at Block 42 and may include providing a shipping platform at Block 44. The method may also include joining a T3 panel structurally different from the shipping platform's top deck to the top deck at Block 46. The method ends at Block 48.

Figure 6:
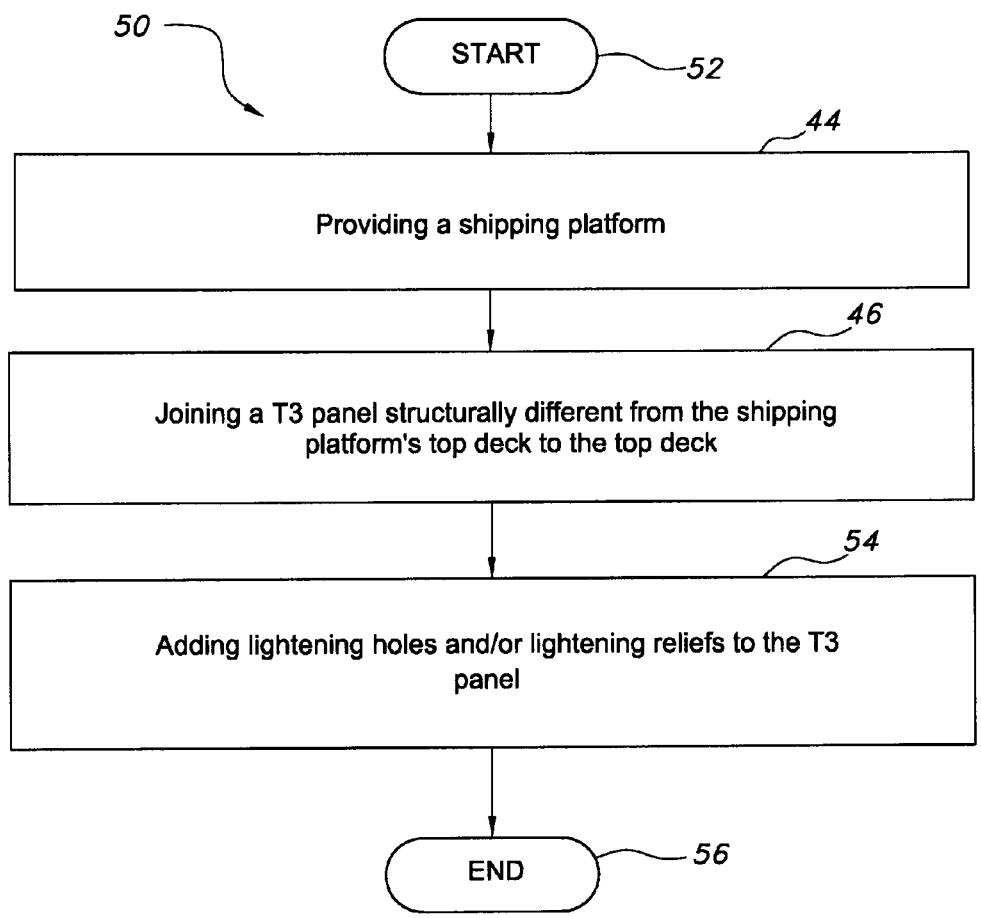
FIG. 6 is a flowchart illustrating method aspects according to the method of FIG. 5.

In another method embodiment, which is now described with reference to flowchart 50 of FIG. 6, the method begins at Block 52. The method may include the steps of FIG. 5 at Blocks 44 and 46. The method may additionally include adding lightening holes and/or lightening reliefs to the T3 panel at Block 54. The method ends at Block 56.

Figure 7:
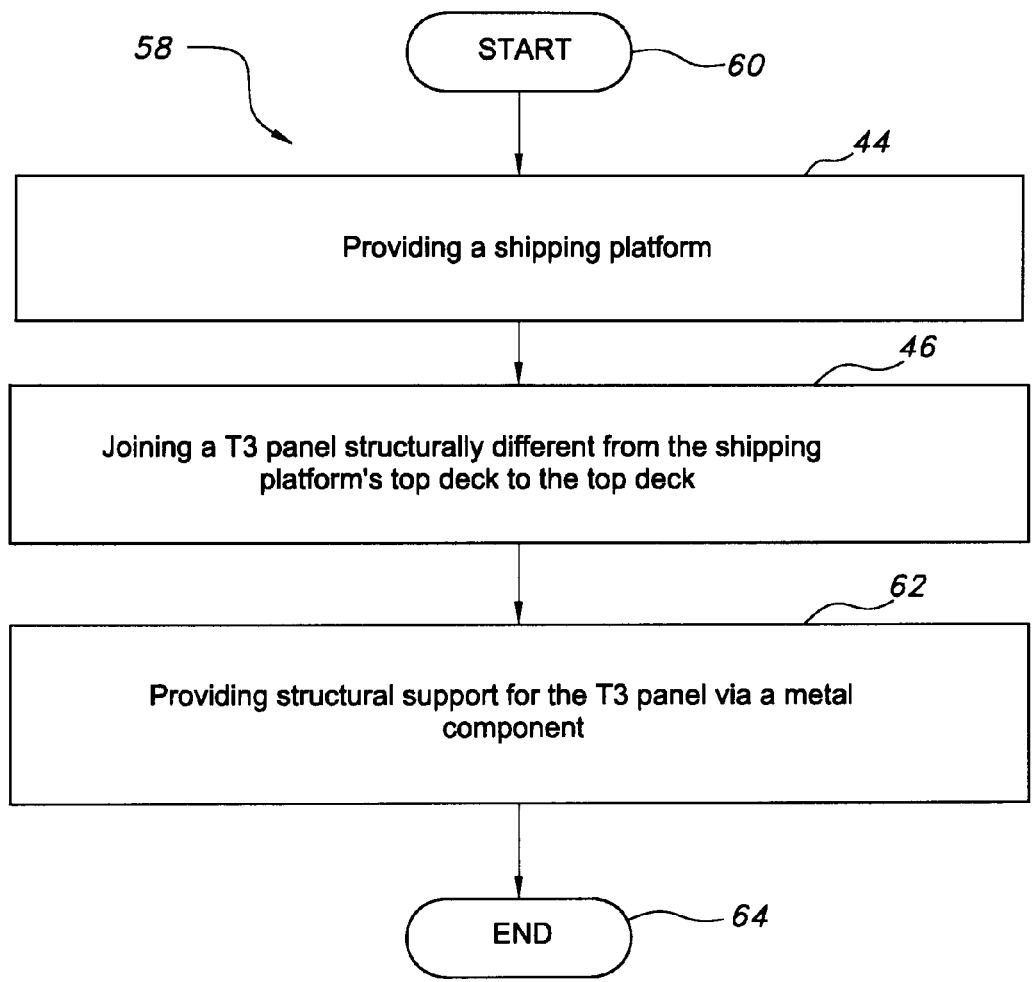
FIG. 7 is a flowchart illustrating method aspects according to the method of FIG. 5.

In another method embodiment, which is now described with reference to flowchart 58 of FIG. 7, the method begins at Block 60. The method may include the steps of FIG. 5 at Blocks 44 and 46. The method may further include providing structural support for the T3 panel via a metal component at Block 62. The method ends at Block 64.

Figure 8:
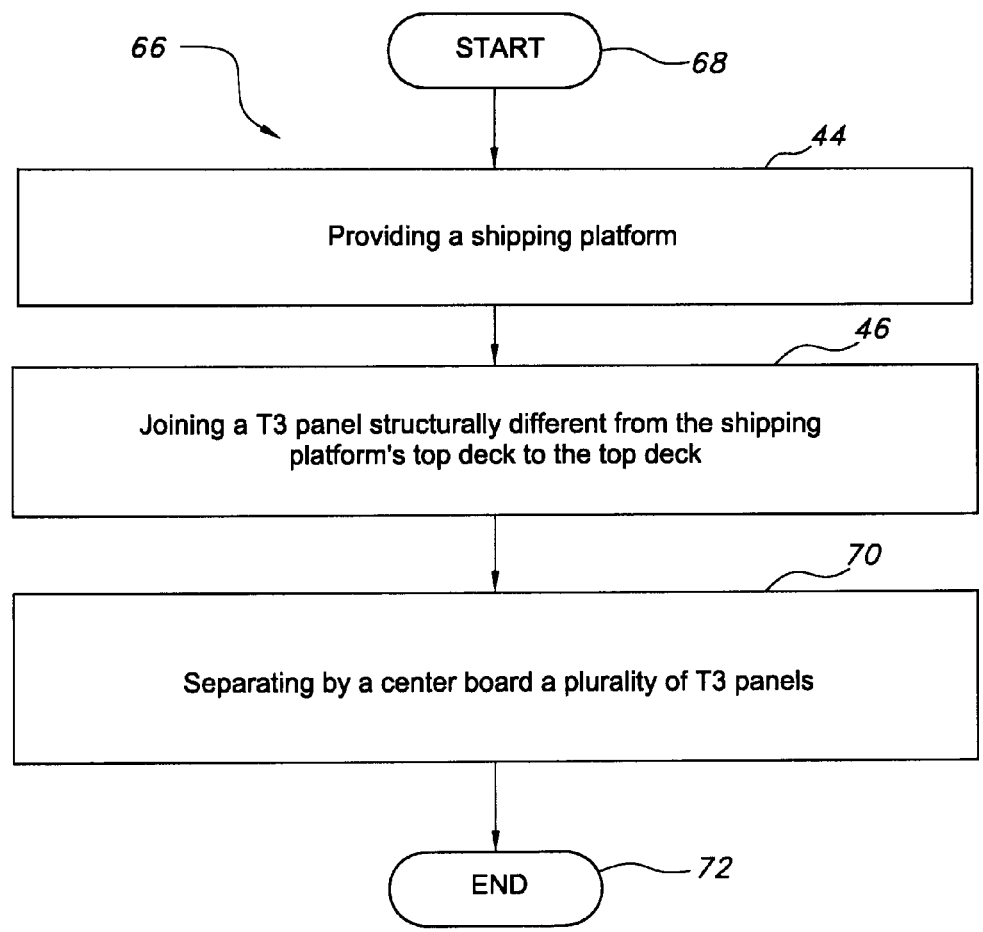
FIG. 8 is a flowchart illustrating method aspects according to the method of FIG. 5.

In another method embodiment, which is now described with reference to flowchart 66 of FIG. 8, the method begins at Block 68. The method may include the steps of FIG. 5 at Blocks 44 and 46. The method may further include separating by a center board a plurality of T3 panels at Block 70. The method ends at Block 72.

Figure 9:
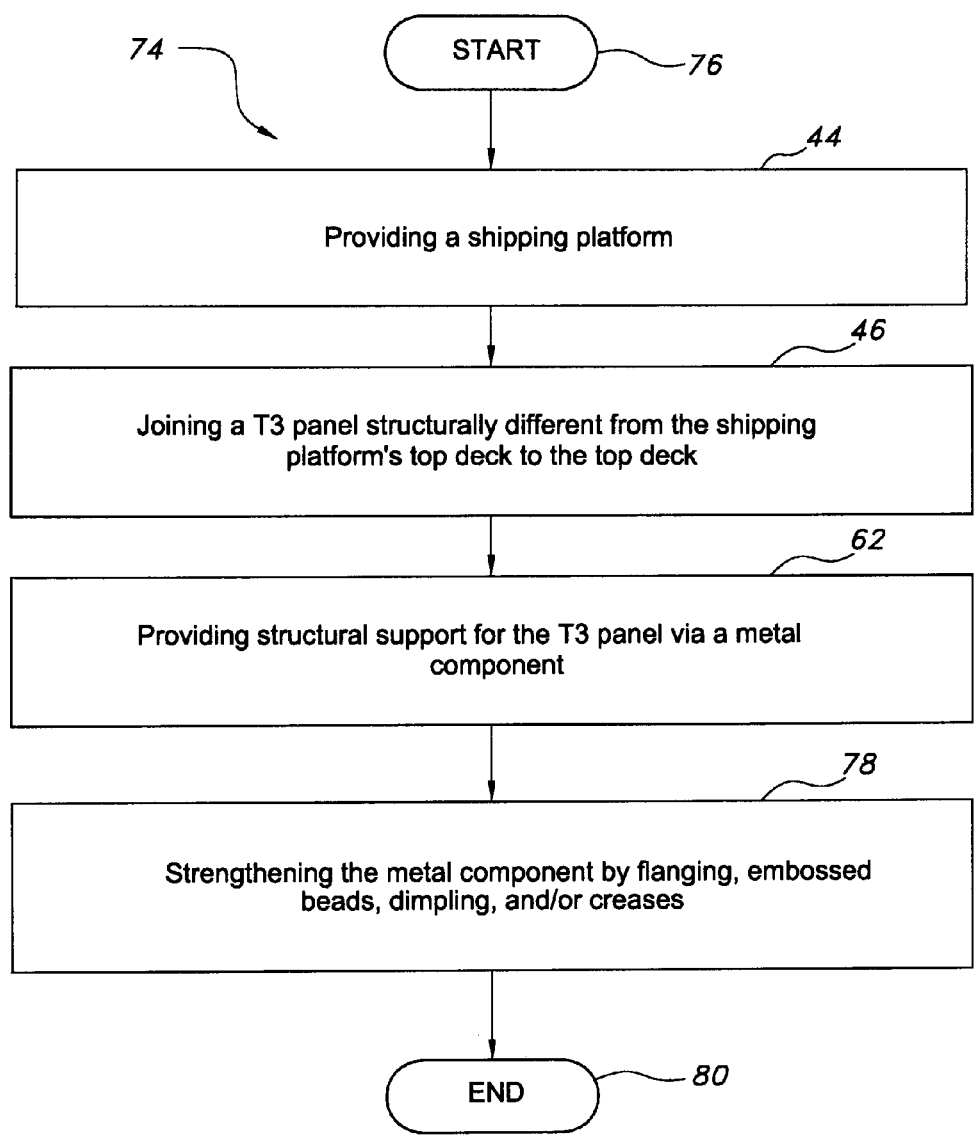
FIG. 9 is a flowchart illustrating method aspects according to the method of FIG. 7.

In another method embodiment, which is now described with reference to flowchart 74 of FIG. 9, the method begins at Block 76. The method may include the steps of FIG. 7 at Blocks 44, 46, and 62. The method may additionally include strengthening the metal component by flanging, embossed beads, dimpling, and/or creases at Block 78. The method ends at Block 80.

Figure 10:
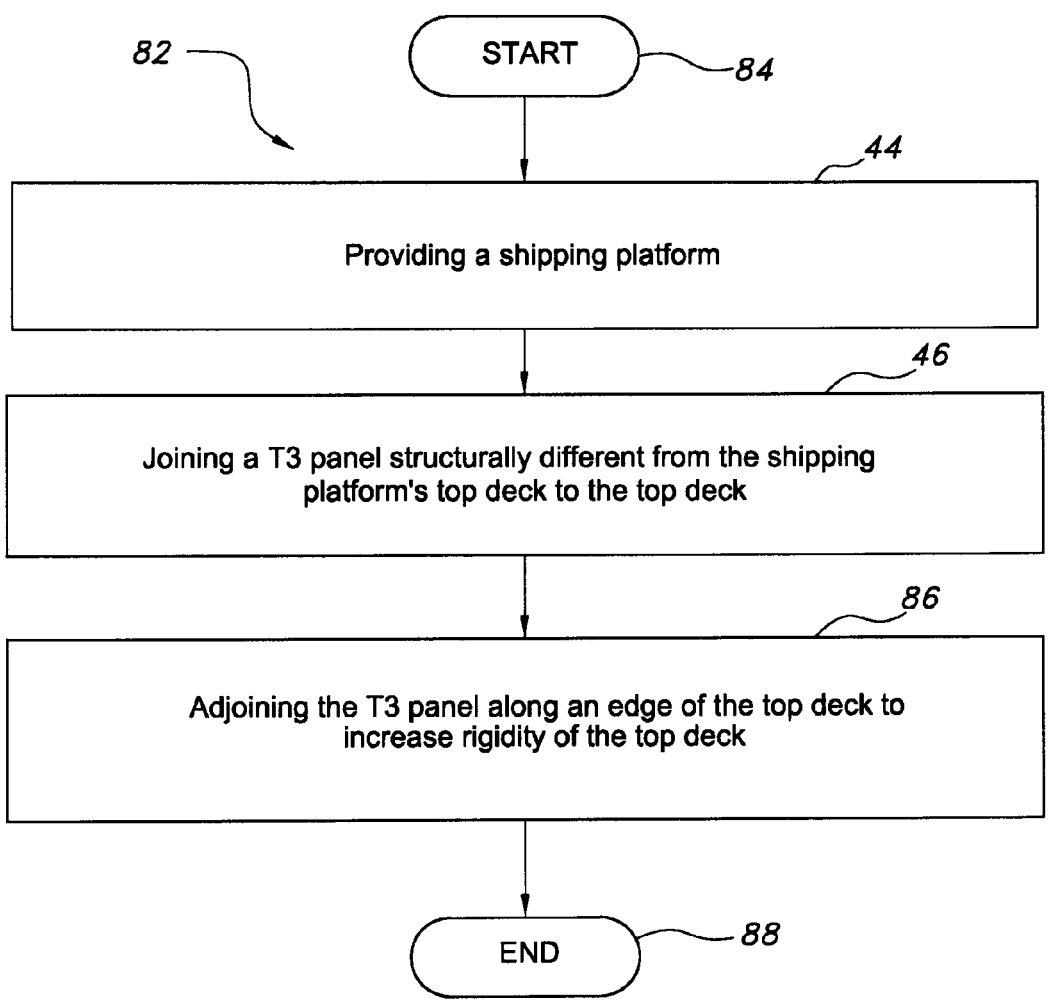
FIG. 10 is a flowchart illustrating method aspects according to the method of FIG. 5.

In another method embodiment, which is now described with reference to flowchart 82 of FIG. 10, the method begins at Block 84. The method may include the steps of FIG. 5 at Blocks 44 and 46. The method may further include adjoining the T3 panel along an edge of the top deck to increase rigidity of the top deck at Block 86. The method ends at Block 88.

An alternative embodiment of the system 10 includes a bottom deck 18 to a shipping platform 12. The system 10 also includes a block 16 joined to the bottom deck 18, and a wooden top deck 14 joined to the block. The system 10 further includes a T3 panel 24 carried by the top deck 14 that is structurally different from the top deck and does not extend to two ends of the top deck, and where the T3 panel comprises plastic, plastic-metal composite, metal, and/or plywood.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiment and the practical application, and to enable others of ordinary skill in the art to understand the various embodiments with various modifications as are suited to the particular use contemplated.

It should be noted that in some alternative implementations, the functions noted in a flowchart block may occur out of the order noted in the figures. For instance, two blocks shown in succession may, in fact, be executed substantially concurrently, or the blocks may sometimes be executed in the reverse order, depending upon the functionality involved because the flow diagrams depicted herein are just examples. There may be many variations to these diagrams or the steps (or operations) described therein without departing from the spirit of the embodiments. For example, the steps may be performed concurrently and/or in a different order, or steps may be added, deleted, and/or modified. All of these variations are considered a part of the claimed embodiments.

While the preferred embodiment have been described, it will be understood that those skilled in the art, both now and in the future, may make various improvements and enhancements which fall within the scope of the claims which follow. These claims should be construed to maintain the proper protection for the embodiments first described.

What is claimed is:

1. A system comprising:
   a bottom deck to a shipping platform;
   a block joined to the bottom deck;
   a top deck joined to the block; and
   a T3 panel carried by the top deck that is structurally different from the top deck and does not extend to two ends of the top deck
   wherein the T3 panel comprises a plastic-metal composite;
   wherein a metal component of the plastic-metal composite provides structural support for the T3 panel.

2. The system of claim 1 wherein the T3 panel comprises at least one of lightening holes and lightening reliefs.

3. The system of claim 1 wherein the top deck comprises wood.

4. The system of claim 1 wherein the metal component comprises one of a round bar, U-channel, and L-channel.

5. The system of claim 1 wherein the T3 panel comprises a plurality of T3 panels separated by a center board.

6. The system of claim 1 wherein the metal component includes at least one of flanging, embossed beads, dimpling, and creases.

7. The system of claim 1 wherein the T3 panel adjoins the top deck along an edge to increase rigidity of the top deck.

8. A method comprising:
   providing a shipping platform;
   joining a T3 panel structurally different from the shipping platform's top deck to the top deck; and
   providing structural support for the T3 panel via a metal component.

9. The method of claim 8 wherein the T3 panel comprises at least one of plastic, plastic-metal composite, metal, and plywood, and the shipping platform's top deck comprises wood.

10. The method of claim 8 further comprising adding at least one of lightening holes and lightening reliefs to the T3 panel.

11. The method of claim 8 further comprising separating by a center board a plurality of T3 panels.

12. The method of claim 8 further comprising strengthening the metal component by at least one of flanging, embossed beads, dimpling, and creases.

13. The method of claim 8 further comprising adjoining the T3 panel along an edge of the top deck to increase rigidity of the top deck.

14. A system comprising:
   a bottom deck to a shipping platform;
   a block joined to the bottom deck;
   a wooden top deck joined to the block; and
   a T3 panel carried by the top deck that is structurally different from the top deck and does not extend to two ends of the top deck, and where the T3 panel comprises at least one of plastic, plastic-metal composite, metal, and plywood;
   wherein a metal component of the plastic-metal composite provides structural support for the T3 panel.

15. The system of claim 14 wherein the T3 panel comprises at least one of lightening holes and lightening reliefs.

16. The system of claim 14 wherein the T3 panel comprises a plurality of T3 panels separated by a center board.

17. The system of claim 14 wherein the T3 panel adjoins the top deck along an edge to increase rigidity of the top deck.

* * * * *